United States Patent
Pike (10) Patent No.: US 7,460,482 B2
(45) Date of Patent: Dec. 2, 2008

(54) MASTER-SLAVE COMMUNICATIONS SYSTEM AND METHOD FOR A NETWORK ELEMENT

(75) Inventor: Dion Pike, Dunrobin (CA)

(73) Assignee: Alcatel-Lucent, Paris (FR)

( * ) Notice: Subject to any disclaimer, the term of this patent is extended or adjusted under 35 U.S.C. 154(b) by 1331 days.

(21) Appl. No.: 10/012,430

(22) Filed: Dec. 12, 2001

(65) Prior Publication Data

US 2003/0091059 A1 May 15, 2003

(30) Foreign Application Priority Data

Sep. 27, 2001 (CA) .................................. 2357939

(51) Int. Cl.
*H04L 12/26* (2006.01)
*H04L 12/42* (2006.01)
*H04J 3/04* (2006.01)

(52) U.S. Cl. ..................... 370/241; 370/449; 370/535

(58) Field of Classification Search .................. None
See application file for complete search history.

(56) References Cited

U.S. PATENT DOCUMENTS

| | | | | |
|---|---|---|---|---|
| 4,736,409 A | * | 4/1988 | Hasegawa et al. ............ | 379/269 |
| 4,751,510 A | * | 6/1988 | de Saint Michel et al. .. | 370/252 |
| 5,007,080 A | * | 4/1991 | MacMillan et al. .......... | 379/269 |
| 5,111,497 A | * | 5/1992 | Bliven et al. ................. | 370/248 |
| 5,274,634 A | * | 12/1993 | Babiarz ....................... | 370/535 |
| 5,361,260 A | | 11/1994 | Mito | |
| 5,455,959 A | | 10/1995 | Simmering | |
| 5,495,240 A | | 2/1996 | Heberle | |
| 5,511,230 A | | 4/1996 | Ryu | |
| 5,758,127 A | | 5/1998 | MacAulay et al. | |
| 5,940,402 A | | 8/1999 | Krakovyak | |
| 6,011,921 A | * | 1/2000 | Takahashi et al. ............. | 710/48 |
| 6,108,758 A | | 8/2000 | Liu | |
| 6,452,946 B1 | * | 9/2002 | Manzardo .................... | 370/487 |
| 6,822,944 B1 | | 11/2004 | Mantin | |

FOREIGN PATENT DOCUMENTS

| | | |
|---|---|---|
| EP | 1 009 132 | 6/2000 |
| EP | 1 014 649 A2 | 6/2000 |
| GB | 2 316 269 A | 2/1998 |
| GB | 2 351 886 A | 1/2001 |

OTHER PUBLICATIONS

Master/Programmable-Slave Computer NTIS Tech Notes, US Department of Commerce, Springfield, VA, US Feb. 1, 1999, p. 116 XP000223879 ISSN: 0889-8464.

* cited by examiner

*Primary Examiner*—Steven Nguyen (57) ABSTRACT

A master-slave communication system for a communication switch is provided. The system comprises a master controller generating commands and receiving status signals and slave devices associated with the master controller. Each slave receives commands, executes local commands responsive to the commands and generates status signals for the master controller. Each slave has a communication arrangement for signals transmitted between it and the master controller. The arrangement comprises a communication controller associated with the master controller. The communication controller receives commands, transmits commands to each slave, receives status signals and provides information relating to the status signals to the master controller; also the controller has a communication link which transmits commands to each slave and the status signals to the controller. The system allows local commands executed by the slaves to replace other commands directed by the master controller to the slave. Further, each slave communicates independently with the master controller.

19 Claims, 8 Drawing Sheets

MASTER-SLAVE COMMUNICATIONS SYSTEM AND METHOD FOR A NETWORK ELEMENT

FIELD OF THE INVENTION

The invention relates to a system and method providing a master-slave communication system for a network element of a communication network.

BACKGROUND OF INVENTION

Many communication switch and router systems architecture enable a service to be selected from a plurality of sources utilizing a master-slave arrangement of a master controller providing resources to, or access by, one of a plurality of slave devices. However, prior art systems lack a mechanism to provide a guaranteed bandwidth of access for each slave device to the master unit where there is significant amount of communication sent between the two entities in the switch. As such, in communication systems, for example, prior art master-slave systems, cannot provide maximum latency guarantees for transmissions therethrough.

There is a need for a system and method providing minimum bandwidth access for master-slave systems that improves upon prior art systems.

SUMMARY OF INVENTION

In a first aspect, a master-slave communication system for a communication switch is provided. The master-slave system comprises a master controller which generates commands and receives status signals and slave devices associated with the master controller. Each slave device receives the commands, executes local commands responsive to the commands and generates the status signals for the master controller. For each slave device, a communication arrangement for signals transmitted between the master controller and the each slave device is provided. It comprises a communication controller associated with the master controller. The communication controller receives commands, transmits the commands to each slave device, receives the status signals and provides information relating to the status signals to the master controller. The communication controller also has a communication link which transmits the commands to each slave device and the status signals to the communication controller. The master-slave communication system allows local commands executed by the slave devices to replace other commands directed by the master controller to the slave devices. Further, each slave device communicates independently with the master controller.

The system may comprise a timing arrangement controlling transmission times of the signals.

The system may have the timing arrangement utilizing a time division multiplex scheme.

The system may have the communication arrangement providing a downstream communication link comprising a multiplexed signal gathering communications from each communication controller into a single multiplexed stream and a demultiplexed signals split from the single multiplexed stream where the signals are provided to each slave device.

The system may have the communication arrangement providing an upstream communication link comprising a multiplexed signal gathering communications from each slave device into a second single multiplexed stream and a second demultiplexed signal split from the second single multiplexed stream which is provided to each communication controller.

The system may have the slave devices each locatable on a separate shelf from the master controller.

The system may have the master controller associated with a control card for the communication switch. The system may have at least one of the slave devices as a fabric interface card. Alternatively, the system may have at least one of the slave devices as a line card.

The system may synchronize communications carried on the downstream communication link and the upstream communication link.

In a second embodiment, a master-slave control system for a communication switch is provided. The system comprises a master controller operable to generate commands for controlling at least one slave device, communications controllers associated with the master controller, a time division multiplexer (TDM) coupled to each communications controller, a time division demultiplexer coupled to the time division multiplexer by a serial link and slave devices coupled to the time division demultiplexer. Each communication controller corresponds to a respective slave device and can send commands thereto according to a predetermined protocol. The multiplexer can form a TDM stream from the commands. The demultiplexer can receive the TDM stream and send commands from a communications controller. Each slave device can receive commands according to the predetermined protocol and respond to the commands.

In a third embodiment, a master-slave control system for a communication switch is provided. It comprises a master controller which generates commands for controlling at least one slave device and a communication link associated with the communication controller and the slave device. The slave device can respond to the commands. The slave device has a communication controller which receives the commands from the master controller and generates a message embodying the command for transmission to the slave device. The communication link receives the message from the communication controller and transmits the message to the slave device.

The system may have the communication link comprising a TDM arrangement associated with the communication controller. The TDM arrangement forms a TDM stream from the commands for a serial link, the TDM stream has a time slot assigned to a communication pair comprising the communication control and the slave device. The TDM arrangement also has a TDM demultiplexer associated with the serial link and the slave device. The TDM demultiplexer receives the TDM stream, extracts message from the stream and transmits the message to the slave device.

The system may have a second communications link between the slave device and the communication controller which transmits data from the slave device to the communication controller. The communication controller receives the transmit data. The master controller may receive the transmit data from the communication controller.

In other aspects of the invention, various combinations and subset of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF THE EMBODIMENTS

The description which follows, and the embodiments described therein, are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

Basic Features of System

The following is a description of a system associated with the embodiment. Briefly, the system provides a master-slave arrangement of devices in a communication switch where a controller is provided as the master controller and a plurality of devices are the slave devices.

Figure 1:
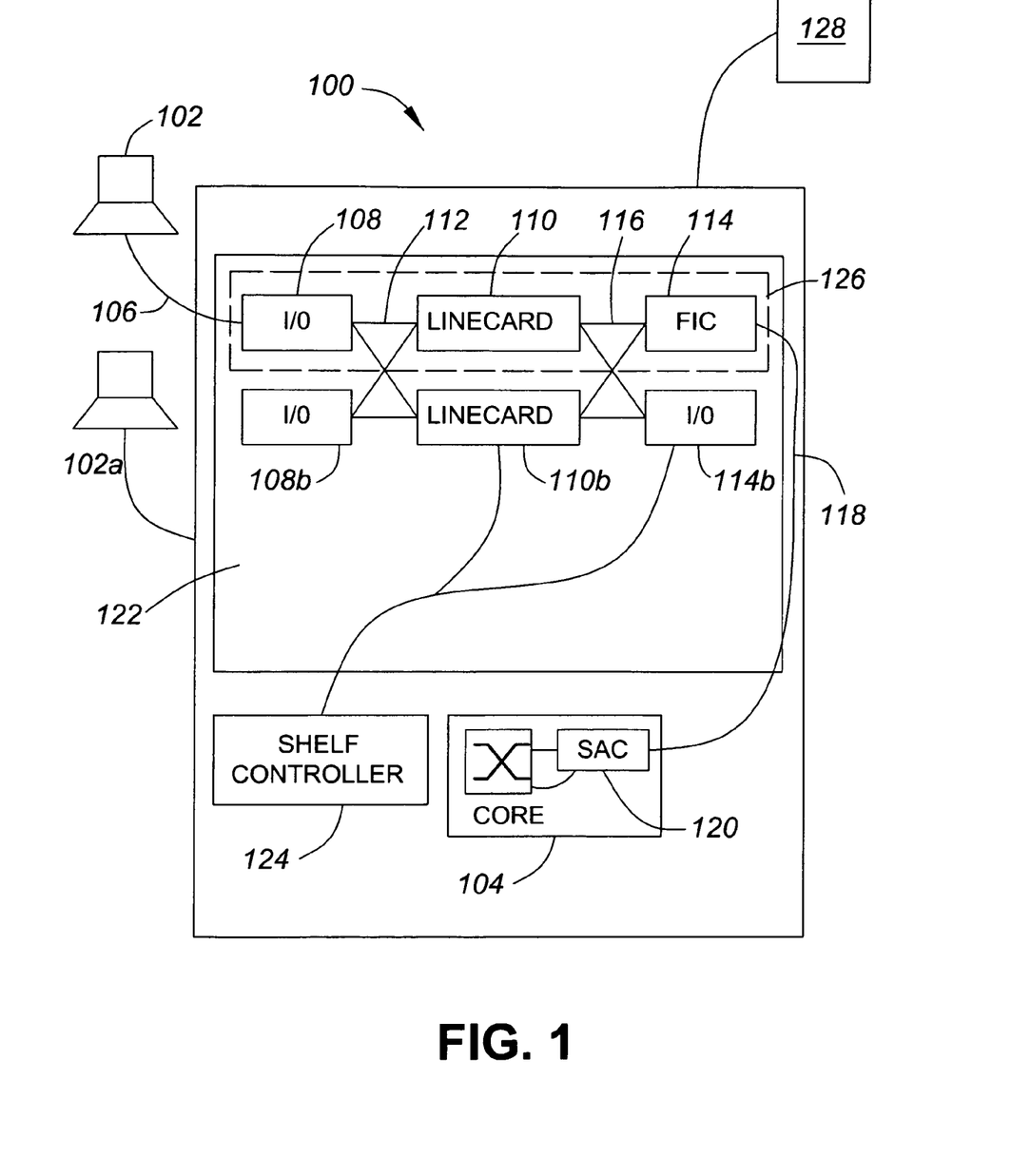
FIG. 1 is a block diagram of elements of a switch of an embodiment of the invention.

Referring to FIG. 1, switch 100 is a multi-protocol backbone system, which can process both of ATM cells IP traffic through its same switching fabric for customer premise equipment (CPE) 102 connected thereto. Through a plurality of cards and processing modules, switch 100 provides CPEs 102 with access to its switching fabric 104 which is the core of switch 100. The switching fabric 104 provides a matrix allowing each CPE 102 to be connected to other devices connected to the switch 100. In the present embodiment, switch 100 allows scaling of the switching fabric capacity from 50 Gbps to 450 Gbps in increments of 14.4 Gbps by the insertion of additional shelves into the switch 100.

CPEs 102 are connected to switch 100 via optical links 106 to I/O cards 108. I/O cards 108 provide the main input and output interface for conversion of communications between CPEs 102 and switch 100. I/O cards 108 provide minimal intelligent processing of communications passed therethrough. I/O cards 108 are connected to line cards 110 via midplane connections 112. Each line card 110 provides OC-192 functionality, bandwidth provisioning and ATM processing of cells between core of switch 100 and each CPE 102. Each line card is also connected to a fabric interface card (FIC) 114, which converts the signal to an optical signal and provides an interface for the communications with core 104.

Accordingly the FIC can monitor and react to conditions reported by the line card 110. For example, the FIC 114 may analyze and respond to failures reported by its line card 110, conduct sanity checks on data received from its line card 110 and send reporting messages to upstream shelf controller (described later).

FICs 114 communicate with LPC 110 via midplane connections 116 and with core 104 via connections 118. The interface to core 104 for each FIC 114 is a switch access card (SAC) 120.

For improved reliability switch 100 is designed as a redundant source system. Accordingly, each I/O card 108, line card 110 and FIC 114 has a redundant counterpart, which is noted with the 'b' suffix. Accordingly, midplane connections 112 and 116 provide cross connections between the redundant and primary devices. For example, I/O cards 108 and 108b are connected to line cards 110 and 110b and line cards 110 and 110b are connected to FICs 114 and 114b.

To provide modular physical grouping of components, I/O card 108, line card 110 and FIC card 114 are grouped together in a single high speed peripheral shelf (HSPS) 122. Each HSPS 122 has two sets of I/O card groupings in slots 126 to provide redundancy between the groups of shelves. Switch 100 enables the use of multiple HSPSs 122 to provide enhanced expandability for the switch. Accordingly, with components grouped into shelves, a number of individual shelves can populate a switch 100 to provide modular functionality for switch 100. However, the use of a modular system requires that control signals for each shelf are also provided in modules, as necessary. This entails separate cabling of bundled control signals to each shelf at a communications point on each shelf. From the communication point, individual signals for individual components in the shelf are isolated and forwarded accordingly.

Each I/O card 108 grouping in HSPS 122 must be controlled and coordinated with the other I/O cards 108 in HSPS 122. Accordingly the embodiment provides a shelf controller 124 which controls operating aspects of shelves 122 connected to it. Such control operations include managing control and status functions for the shelf (such as slot monitoring and fan unit control), controlling FIC configuration for each line card 108, power rail monitoring and clock signal monitoring.

Shelf controller 124 provides control connectivity via a specialized control service link (not shown). Data carried in the control service link controls downstream configuration and software downloading, time stamping, and synchronization of clocks.

A terminal 128 is connected to switch 100 and runs controlling software which allows an operator to modify, and control the operation of, switch 100.

Figure 2:
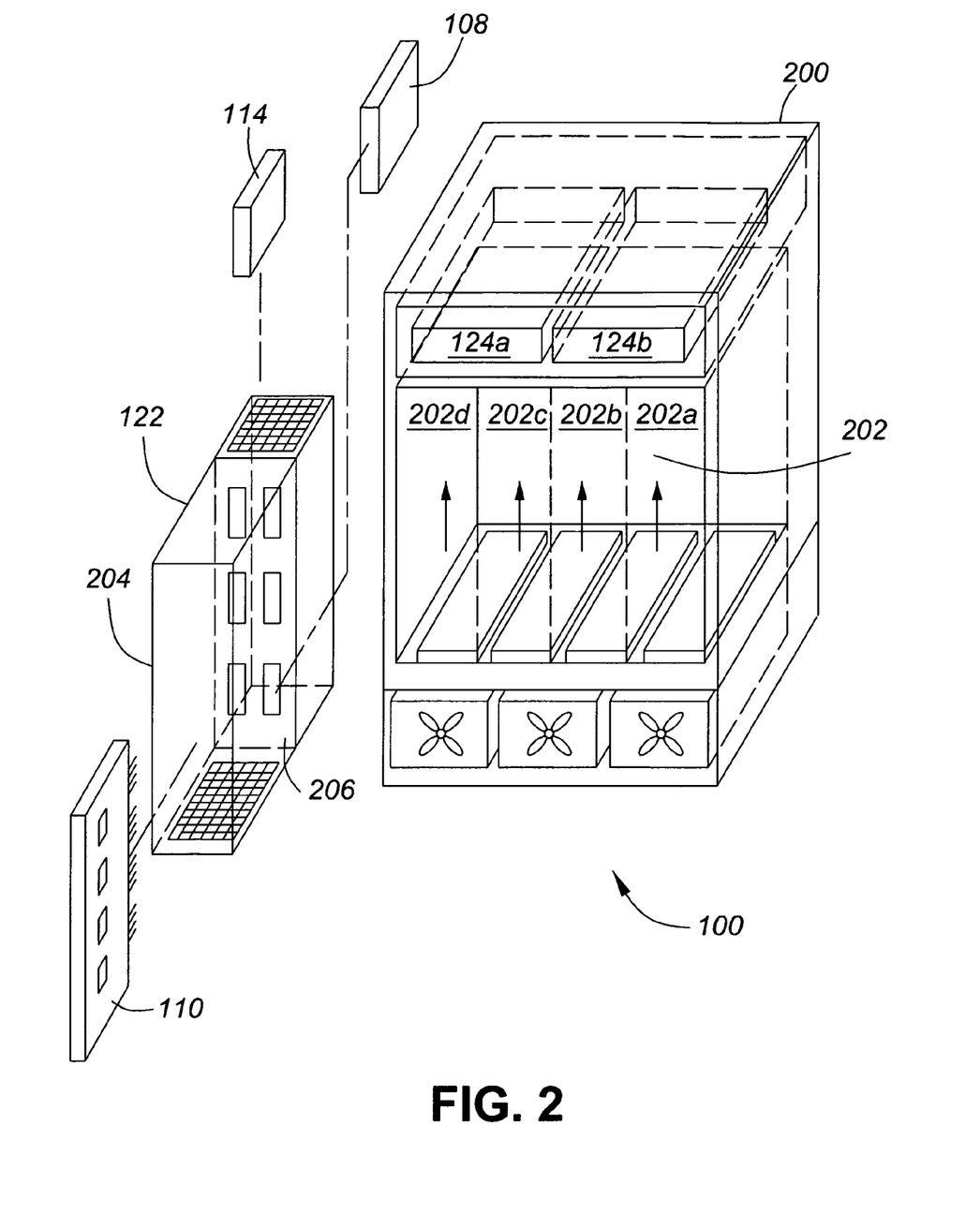
FIG. 2 is a block diagram of components and connections of the switch of FIG. 1.

Referring to FIG. 2, switch 100 physically comprises a chassis 200, which houses HSPS 122 in cavity 202. HSPS 122 is contained in housing 204, which sits in a section of cavity 202. Shelf controller 124 is located above cavity 202. Each housing 204 contains a midplane 206, which is a physical support structure having connectors allowing line cards 110, FICs 114 and I/O cards 108 to be connected thereto. Connections 112 and 116 (see, FIG. 1) are provided by appropriate electrical connections between connectors in midplane 206.

Figure 3:
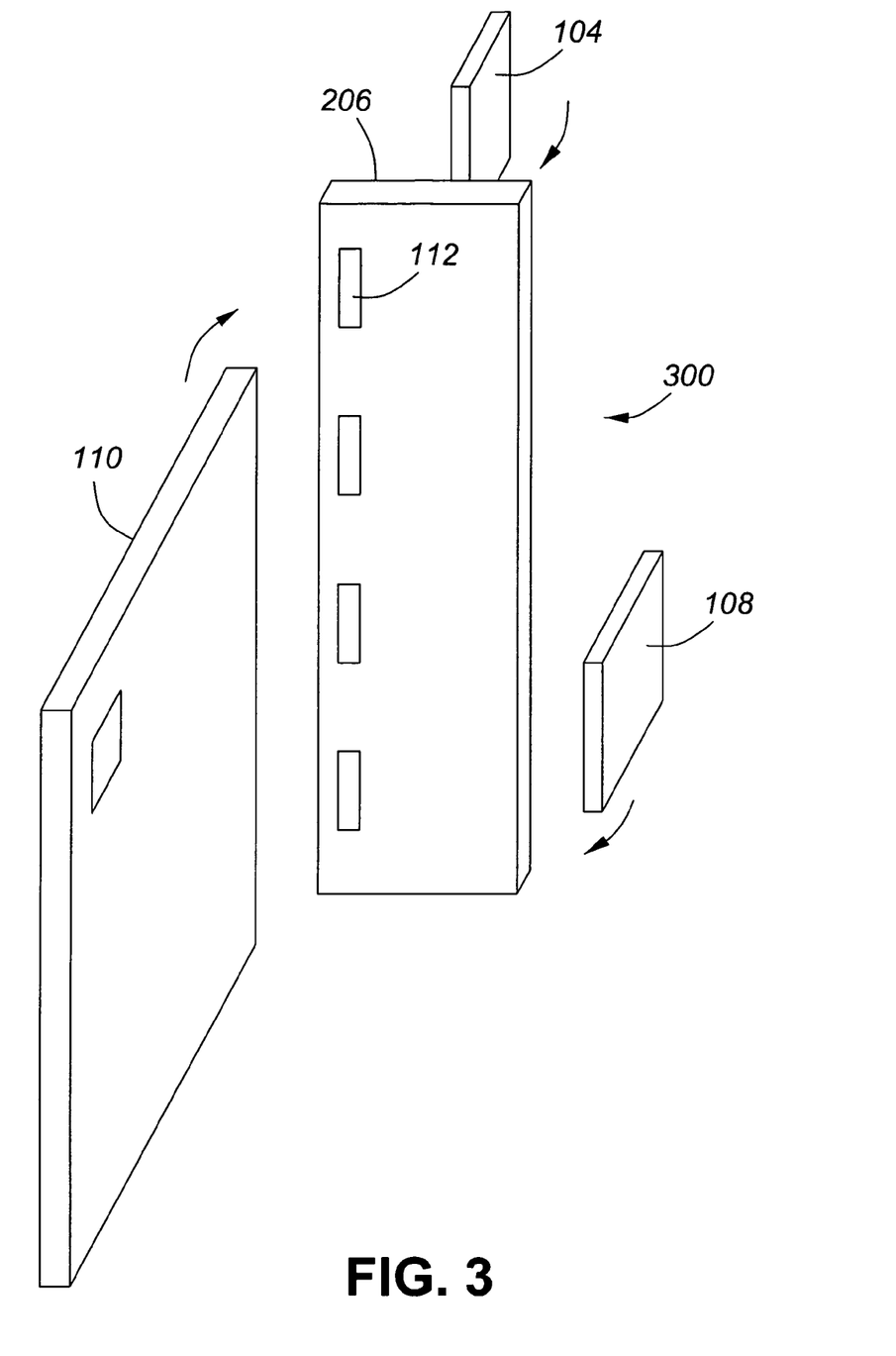
FIG. 3 is a block diagram of midplane connection of the switch of FIG. 1.

Referring to FIG. 3, view 300 illustrates line card 110, I/O card 104, and FIC card 108 and midplane 206 for housing 204. Cards that have optical interfaces, namely the I/O card 104 and FIC card 108, are located on one side of the midplane 206 and line card 110 is located on the other side of the midplane 206. Connectors 208 provide the physical interface for the cards to midplane 206. Specific connections between I/O card 104 and line card 110 and FIC card 108 are provided from the pins of various connectors 208 through midplane 206.

It will be appreciated that terms such as "routing switch", "communication switch", "communication device", "switch", "network element" and other terms known in the art may be used to describe switch 100. Further, while the embodiment is described for switch 100, it will be appreciated that the system and method described herein may be adapted to any switching system.

Referring to FIG. 1, with a large number of I/O cards 108, there is a need to have a mechanism for providing instructions from the shelf controller 124 to each line card 110. Traditionally, either the remote line card was dumb, having no processing capabilities, e.g. a typical I/O card, or alternatively, all of the intelligence was placed on the line card, e.g. a typical line card or a FIC. However, by migrating the intelligence of the processing from either fully on the card or filly off the card, the computing power required at the processing end becomes too large for the processing entity.

Accordingly, the embodiment utilizes a system wherein computing is distributed between the FIC 114 and the shelf controller 124. At a broad level, the shelf controller 124 identifies what actions need to be taken by a FIC 114 and sends an appropriate instruction to the FIC 114. Each FIC 114 receives and processes its instruction and provides a suitable response to the shelf controller 124. In this view, the "master" element is the operative element in the shelf controller 124 and the "slave" element is the FIC 114. The term "master" is used interchangeably with "shelf controller" and the terms "slave" and "FIC" are also interchangeable for this specification. It will be appreciated that in other embodiments, the slave may be line card 110 or any other downstream device to the master.

Figure 4A:
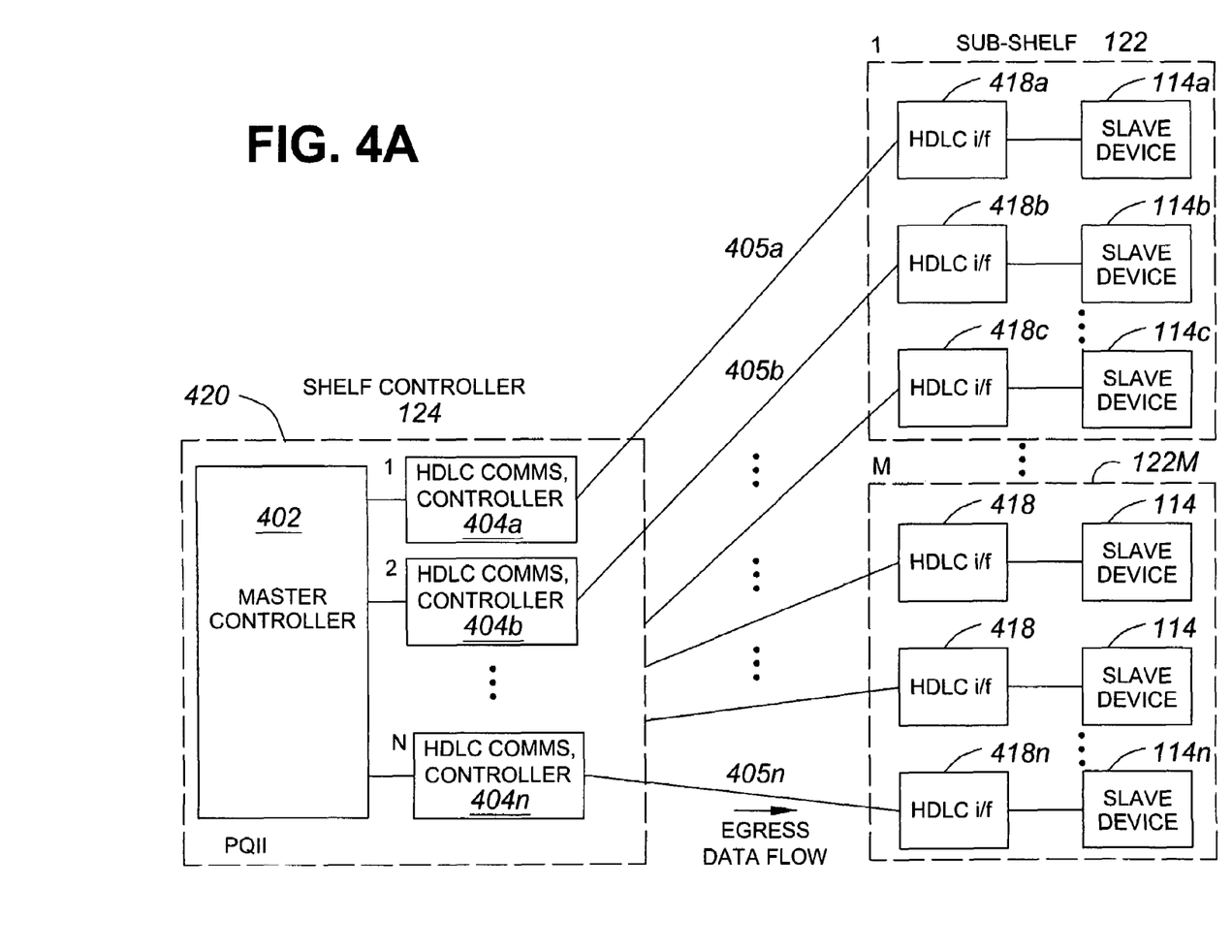
FIG. 4A is a block diagram of a controller unit and shelf units of a further embodiment of the switch of FIG. 1.
Figure 4B:
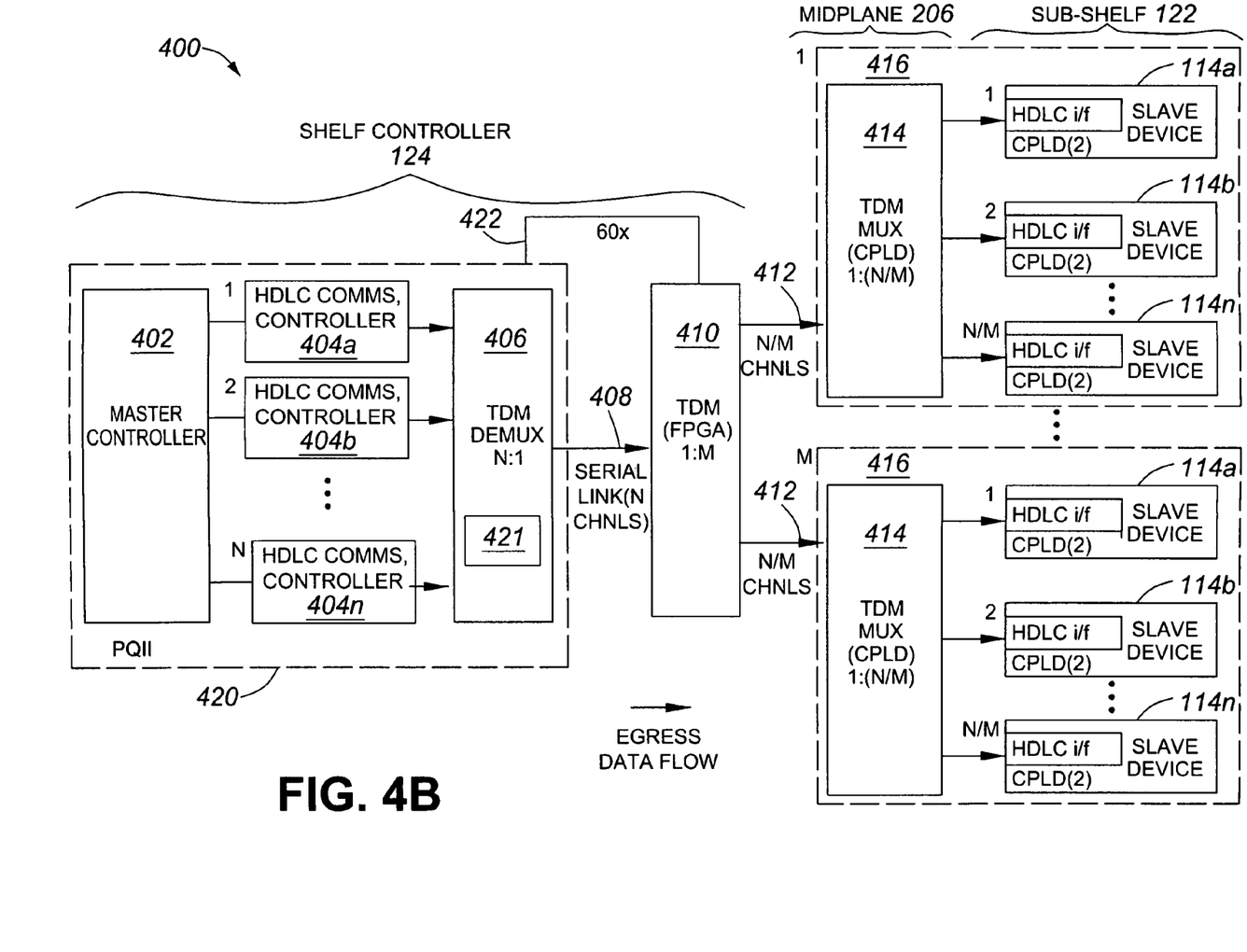
FIG. 4B is a block diagram of a controller unit and shelf units of a further embodiment the switch of FIG. 1.
Figure 5:
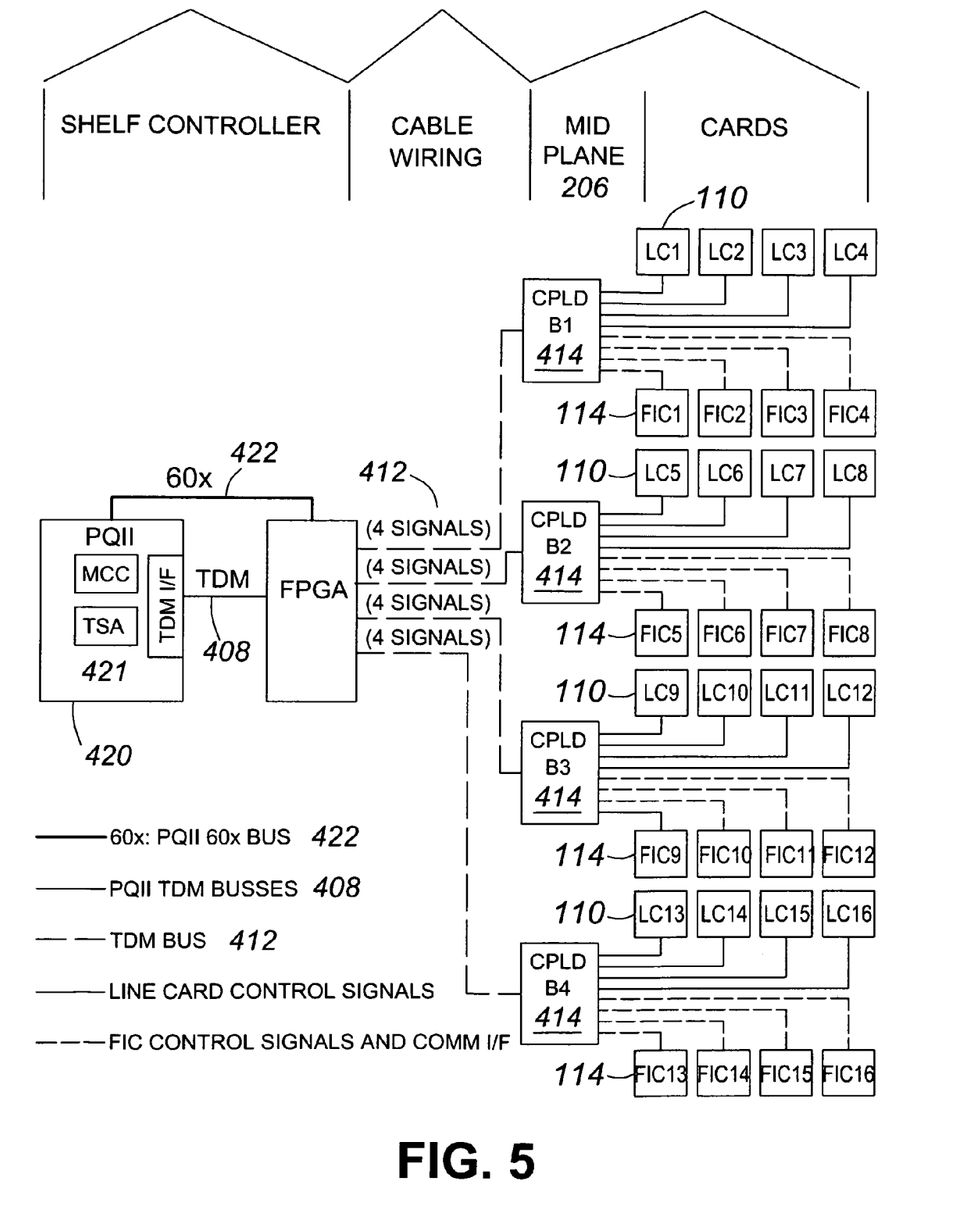
FIG. 5 is a block diagram of a cabling and interface arrangement for the controller and shelf units of the switch of FIG. 4B.

Referring to FIGS. 4A, 4B and 5, the embodiment provides an egress communication system 400 for each HSPS 122 and the shelf controller 124. In the shelf controller 124 master controller 402 produces individual commands for each FIC 114 in each subshelf 122. Communication controllers 404 in shelf controller 124 receive each command for each FIC, or slave 114 and has them sent to each slave 114. Each HDLC communication controller 404 communicates with the FIC cards in slave 114 to request read/write access to FIC registers (not shown). For example, on a "read" command, master controller 402 may require status data about slave device 114a. In the distributed system, master controller 402 generates a read command for a particular flag of slave device 114a. Communication controller 404a receives the command from master controller 402 and has the command sent, ultimately, to slave device 114a, which receives the read command and processes it. After the read command is processed by slave device 114a, a response is generated and is sent back to master controller 402 through an ingress communication system 500, which provides an ingress communication link from each slave device 114a to controller 404a.

Each controller 402 uses HDLC (High Level Data Link Control) protocol. HDLC is a known ISO and ITU-T standaridized link layer protocol used in point-to-point and multipoint communications. HDLC provides bit-oriented synchronous transmission of variable length frames. In the embodiment, master 124 has unbalanced links with slaves 114. Accordingly, master 124 polls each slave 114 as necessary, and each polled slave 124 responds with information frames. The master 124 then acknowledges receipt of the frames from the slave. It will be appreciated that other communication protocols may be used. It will be appreciated that as there is a dedicated master for each slave, collectively, polling amongst all slaves can be done concurrently.

Shown below is an HDLC frame used in the embodiment by the egress system of FIG. 4A.

| Start Flag | HDLC Cntrl | Data Field | CRC | End Flag |
|---|---|---|---|---|
| 8 | 8 | X | 16 | 8 bits |

The field length (in bits) is variable, depending on the HDLC control field. As an example, master 404 may request to a slave 114 to respond with a report of the status of all interrupts on slave card 114. Accordingly, the slave 114 would read all its registers that contain an interrupt status. An interrupt status may, for example, store the change of state information of an optical signal received by a pin diode. The slave 114 collects the register information and transmits it to master 402 per the designed communication protocol. It will be appreciated that this distributed messaging system overall provides a faster response time than have a master communicate with each slave device individually to and read their register status. Further, as each slave 114 only has knowledge of its local status, the master can collect all slave 114 information, then provide a response based on the net status of all slave registers. Referring to the earlier example of a read cycle, in the embodiment when master controller 402 requires data from a particular slave 114a, the control field is set to 00000000 by software in master controller 402 and the data field is defined as 32 bits containing an embedded 16 bit slave address as shown below:

| | Data field Structure | |
|---|---|---|
| Read/ Write | Address Bus | Data Bus |
| 1 | 15 | 16 |

Referring to FIG. 4A, in one embodiment, it will be appreciated that for the master-slave system, it is possible to have a communication system where each communication controller 404 is individually hardwired to each slave 114 with links 405. In another embodiment, in order to reduce the number of physical communication links between the communication controllers 402 and the slaves 114, multiplexing of signalling links is provided on both the ingress and egress directions. This is shown in FIG. 4B.

Accordingly, referring to FIGS. 4B and 5, for multiplexing signals, each communications controller 404 receives instructions from master controller 402; each HDLC controller 404 is connected to multiplexer 406, producing one serial stream of data containing N channels of data on serial link 408.

Each communication controller 404 and master controller 402 is contained within a microprocessor 420. In the embodiment, microprocessor 420 is a MPC 8260 Power PC PowerQUICC II programmable processor, available from Motorola, Inc. Microprocessor 420 has a programmable multichannel controller (MCC). The embodiment configures the MCC to provide the 16 communication controllers 404. Microprocessor 420 also has an internal multiplexer 406 to produce single datastream 408 from the datastreams produced by the communication controllers 404. Also, microprocessor 420 has a time slot assignor 421 which assigns a 8-bit timeslot from the TDM stream 408 to each of the controllers 404. The TDM stream contains sixteen 8 bits slots and operates at 8.25 MHz. Accordingly, the TDM stream in link 408 comprises 16 serial packets as shown below:

| Ch 0 | Ch 1 | | Ch 16 |
|---|---|---|---|
| HDLC 1 | HDLC 2 | ... | HDLC 16 |

It is desirable to have the HDLC timeslot at a minimum length (and thus the TDM stream at a minimum length) to decrease the latency on time-sensitive information in the TDM stream (such as interrupt status).

Serial link 408 is provided to a group demultiplexer 410 which collectively groups the N channels into M channels 412. The demultiplexer 410 is embodied in a field programmable gate array (FPGA) 410.

Control for demultiplexer 410 is fixed and the demultiplexing does not change on different conditions. As will be further described later, a bit counter signal and a channel counter signal are associated with the TDM stream. The bit counter signal and the channel counter signal are used by demultiplexer 410 to identify which bits from controllers 404 (or which bits from registers within FPGA 410) are inserted into which channel 412 at the correct frame.

The FPGA 410 provides the following functions for microprocessor 406. First, the TDM stream 408 between the microprocessor 420 and FPGA 410 contains HDLC interfaces for FIC communications. The FPGA splits out TDM stream 408 into individual MTDM streams 412 for each of the HSPS sub-shelves 122. Control signals are embedded into the TDM stream 408 by FPGA 410. Second, control signals for a FIC, such as Line Card Presence, sub-shelf Number, FIC Interrupt Status, etc. may be transmitted between microprocessor 420 and slave 110 using the signal multiplexing scheme and FPGA 410. Microprocessor 420 provides a request for control signals for a FIC to FPGA 410 sent via 60x bus 422. FPGA 410 inserts an appropriate request in the appropriate timeslot for the requested slave 114 in the appropriate egress datastream 412. The targetted slave responds to the request and transmits the status to FPGA 410 via the ingress multiplexed stream. The results are stored in FPGA registers, which can be accessed by microprocessor 420 over bus 422. Also, FPGA 420 may send a (maskable) interrupt to microprocessor 420 upon a status change of a control signal. Third, FPGA 410 also performs a digital phase comparisons of the selected sources of timing from the shelf 124 and compares it with the system source sent to the shelf.

From the FPGA 410, four TDM streams 412 connect the shelf controller to each of the four subshelves. In the embodiment, the second TDM stream has sixteen timeslots operating at 8.25 MHz for each subshelf 122. Each M channel 412 is provided to each subself 122. Each of the four TDM sub-streams 412 (one to each sub-shelf) is a 16 timeslot frame operating at 8.25 MHz.

Similar to demultiplexer 410, TDM demultiplexer 414 utilizes the bit counter signal and the channel counter signal to determine which incoming part of the datastream on channel 412 is sent on which outgoing channel 416.

In each subshelf 122, demultiplexer 414 receives each channel 412 and produces N/M separate communication links 416, each of which is provided to each slave 114. Each slave device 114 has a HDLC interface module 418 which translates the HDLC encoded datastream 416 into a format which can be used by each slave 114. Each communication controller 404 has a timeslot in the TDM stream assigned to it. Similarly, each slave device 114 has a timeslot assigned to it for sending information to the master controller. Also, slave devices 114 can interrupt the master controller 124 at any time, if required.

Having a dedicated communications controller 124 and corresponding control bandwidth for each slave device 114 ensures that control commands from the master controller 402 will be received by the slave devices 114 within a deterministic amount of time.

Figure 7:
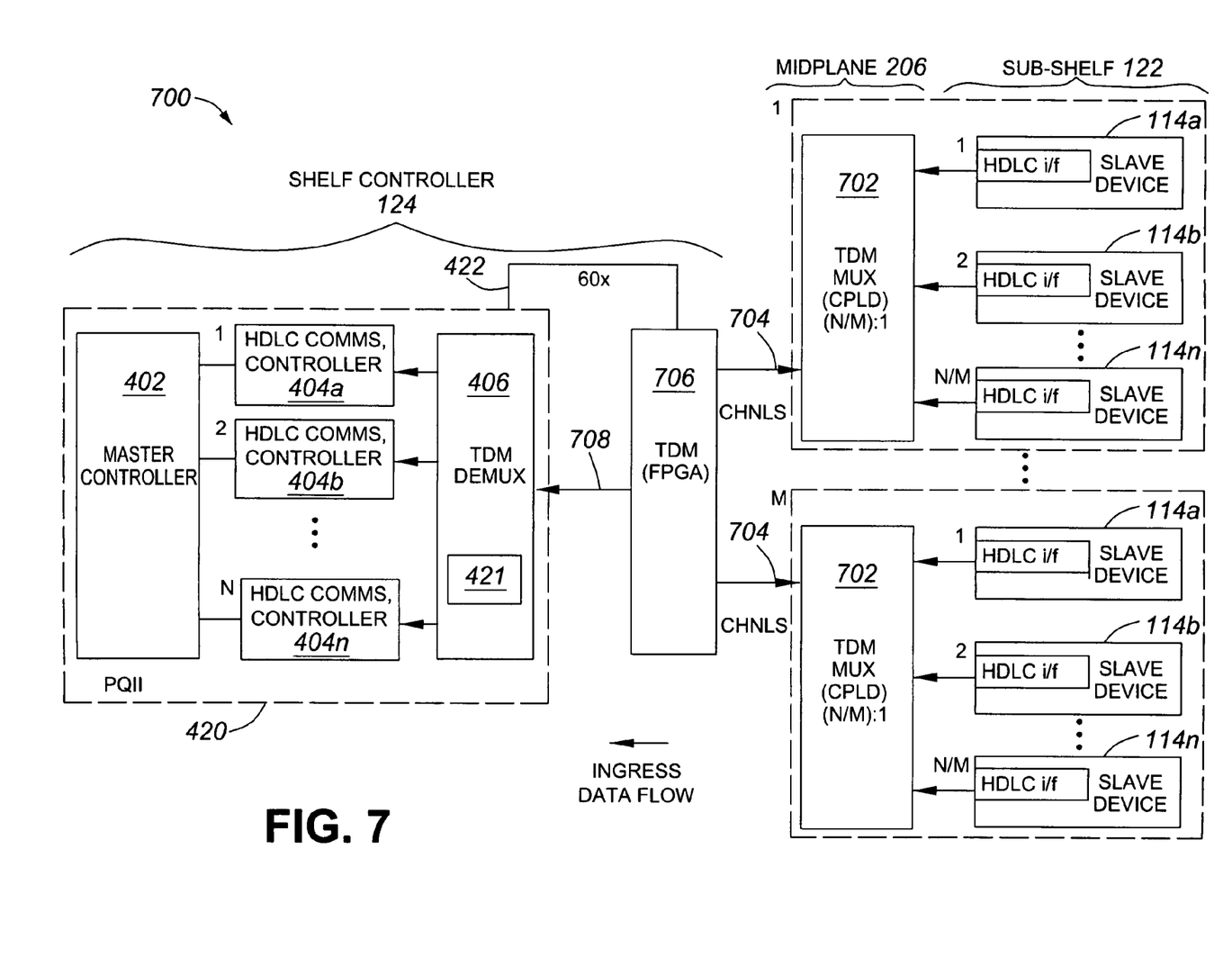
FIG. 7 is a block diagram of multiplexing system for ingress transmissions associated with the switch of FIG. 4B.

Referring to FIG. 7, for multiplexing signals in the ingress direction, system 700 is shown. Therein, each slave 114 generates a response or a signal destined for master controller 402; each slave 114 is to multiplexer 702, producing one serial stream of data containing N/M channels of data on serial link 704.

Serial link 704 is provided to FPGA 410 which processes the information in the N/M channels 704 and provides an appropriate response, if necessary to master controller 402 via 60x bus 422.

Since each slave device 114 has its own timeslot during which it can communicate with the controller 402, information from the slave devices 110 will reach the master controller 402 within a defined amount of time. This allows bidirectional communications between the slave devices and the master controller to occur within a guaranteed latency. Accordingly, the embodiment allows a multishelf platform to detect a fault within 10 ms re-route around the fault within 50 ms, thereby conforming with requirements of a carrier-grade system.

It will be appreciated that ingress multiplexing system 700 shares functional similarities with egress system 400. However, in addition, line cards 110 and I/O cards 108 generate some status signals as dc signals (not shown) which are provided to their CPLD 702. Each CPLD may embed these signals into the datastreams of its respective channel 704. At FPGA 706, these embedded signals may be extracted and processed locally as needed. For example, they may be provided to other cards and systems associated with the FPGA 706.

In the embodiment, an ingress signalling system is also provided, which is similar to egress system 400, and is described later.

Figure 6:
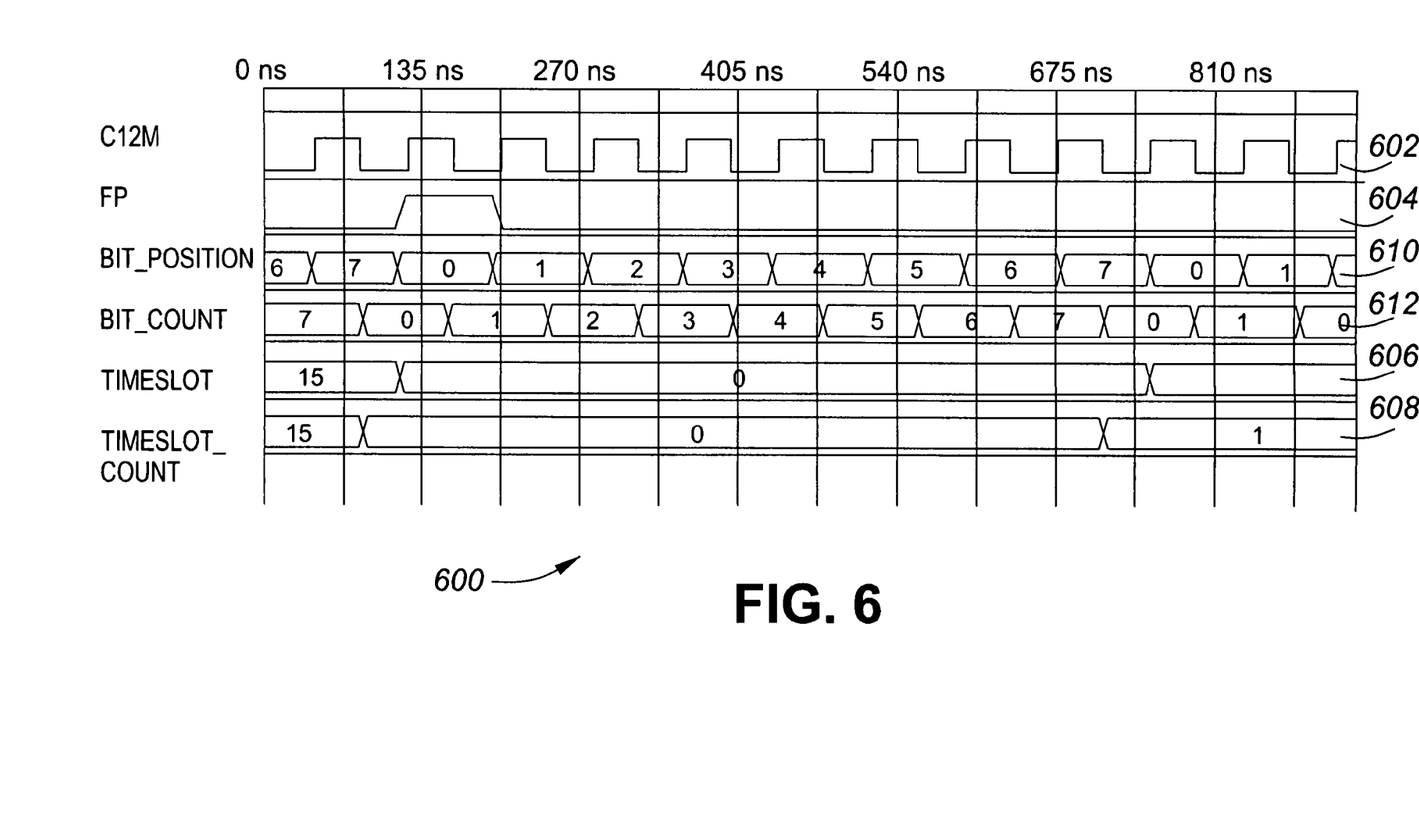
FIG. 6 is a timing diagram of time slots for the communication protocol used between the controller and shelf units of the switch of FIG. 4B.

Referring to FIG. 6, each TDM bus is configured according to the following timing parameters. Each multiplexer has access to these timing signals. A common clock 602 operates at 8.25 MHz and a frame pulse (FP) 604 operates at 64.45 KHz. The rising edge of FP 604 is aligned to the rising edge of clock 602. The FP defines a frame for a byte of transmitted information.

Within each frame pulse, there are 16 timeslots, one slot for each slave device. The current timeslot number in the TDM stream is indicated by timeslot signal 608. In order to provide the system with an earlier indication of the arrival of the next timeslot, timeslot count signal 608 in generated which is the same count signal as timeslot signal 606, but it is generated half a clock cycle earlier.

Within each timeslot there are eight bit positions. The current bit position is indicated by bit position signal 610. As with the timeslot signal 606, as a mate to bit position signal 610, bit 10 position count signal 612 is generated to provide the system with an earlier indication of the arrival of the next bit position.

These signals are generated by the FPGA 410 (not shown). The first bit of the first timeslot (bit 7 of timeslot 0) is the MSB and will be coincident with the rising edge of FP 406. As there are 8 bits of data per timeslot, for data transactions involving data fields of more than 8 bits requires more than 1 TDM slot. Successive required slots are provided in the next TDM superframe.

Also, the timing of signals sent between shelf controller 124 to each of subshelf 104 requires that no cells be dropped. Timing is handled in the following manner.

Referring to FIG. 4, for each controller 404, each HDLC stream is transmitted at a clocking rate of 8.25/16 MHz, i.e. approximately 516 kHz, (or "R" for "Rate") to multiplexer 406. Once all of the 16 TDM streams are combined into a single TDM stream at multiplexer 406, the collective datastream is clocked at 16x R on serial link 408 to ensure that successive packets from each controller 404 in successive frames are not lost. The collective datastream on link 408 is provided to FPGA 410 which splits datastream into four separate datastreams on channels 412. Each separate datastream on each channel 412 contains datastreams for 4 HDLC slots destined for demultiplexers 414 associated with each subshelf 122. The clocking rate for each datastream on each channel 412 is still 16R. Accordingly, there is additional bandwidth available in each datastream in each channel 412, as only four slots are needed in the time frame which contains 16 time slots. Accordingly, 12 control slots are added to each datastream in each channel 412 by FPGA 410. The control slots contain information embedded into them by FPGA 410.

From each demultiplexer 414, each datastream is then passed to a CPLD within demultiplexer 414, which can extract some of the control information from the datastream for the FIC 114 or line card 110. The CPLD is located on midplane 206. The CPLD 414 further splits the datastream into four sub datastreams on channels 416, 1 channel 416 per slave device 114. At each slave device 114, a second CPLD (#2) can extract further control information from the received datastream. The received HDLC datastream is then clocked-down to the original clocking rate of 8.25 MHz/16, i.e. approximately 516 kHz (R). The clocked-down data for data transmissions received by a slave device 114 contains the original information embedded in the TDM stream from its corresponding controller 404a.

It will be appreciated that in the above timing arrangement, timing is maintained for the data rate and additional control information is provided in each datastream without occupying "true" bandwidth from the master-slave communication link.

Following is an example of latency aspects of the system. In the embodiment there are 16 timeslots in the TDM stream 408, which is clocked at 8.25 MHz. Accordingly it takes 15.5 us to transmit the whole TDM stream 408. An average read or write cycle for microprocessor 420 on the FIC is 200 ns (4-clock cycle access at 20 MHz). When the FIC microprocessor gets a local interrupt it performs 11 reads (in the worst case) to determine the source (1 interrupt cause register, then 10 registers). Accordingly the processing time is:

11×200 ns=2.2 us

The microprocessor must also write the contents of these 10 registers into the HDLC FIFOs, thereby requiring 10×200 ns=2 us For a worst-case scenario of a 120-bit HDLC frame, there are 120 bits required for the HDLC frame (see frame below) and there are 8 bits of the HDLC frame transmitted each TDM stream, it takes 15 TDM streams to transport this HDLC frame back to the microprocessor 420, i.e. 15×15.5 us=232.5 us.

If a factor for receiver latency of 2 TDM frames is 2×15.5=31 us, it takes 2.2+2+232.5+31=267.7 us.

As noted earlier, each HDLC link is dedicated, so if all 16 FIC 114 were reporting to their respective masters 404, the total maximum service time is still 267.7 us.

It is noted that those skilled in the art will appreciate that various modifications of detail may be made to the present embodiment, all of which would come within the scope of the invention.

I claim:

1. A master-slave communication system for controlling elements in a digital communication switch, comprising:

a master controller for generating master commands and receiving status signals;

a plurality of slave devices associated with said master controller, each slave device of said plurality of slave devices being operable to receive said master commands, execute local commands in response to said master commands, and generate said status signals for said master controller upon execution of said local commands;

said master controller being associated with a plurality of master communication controllers corresponding respectively to each of said slave devices and operable to receive said commands from the master controller, transmit said commands to said respective slave devices, receive said status signals from said slave devices, and provide information relating to said status signals to said master controller;

each said slave device being associated with a slave communication controller communicating with a corresponding said master communication controller;

independent communication links between each said master communication controller and the slave communication controller corresponding thereto;

said master communication controllers being operable to transmit said master commands independently to, and receive said status signals independently from, each said slave device to permit concurrent polling by said master controller of said slave devices; and said master controller being operable to issue said master commands based on the collective status of all said slave devices.

2. A master-slave communication system as claimed in claim 1, further comprising a timing arrangement controlling transmission times of said signals.

3. A master-slave communication system as claimed in claim 2 wherein said timing arrangement utilizes a time division multiplex scheme.

4. A master-slave communication system as claimed in claim 3 wherein said communication arrangement provides
a downstream communication link comprising a multiplexed signal gathering communications from each said communication controller into a single multiplexed stream; and
a demultiplexed signal split from said single multiplexed stream to each said slave device.

5. A master-slave communication system as claimed in claim 4 wherein said communication arrangement provides an upstream communication link comprising a multiplexed signal gathering communications from each said slave device into a second single multiplexed stream and provides a second demultiplexed signal split from said second single multiplexed stream to each said communication controller.

6. A master-slave communication system as claimed in claim 5 wherein said plurality of slave devices are each locatable on a separate shelf from said master controller.

7. A master-slave communication system as claimed in claim 6 wherein at least one of said plurality of slave devices is a fabric interface card.

8. A master-slave communication system as claimed in claim 7 wherein at least one of said plurality of slave devices is a line card.

9. A master-slave communication system as claimed in claim 7 wherein communications carried in said downstream communication link and said upstream communication link are synchronized.

10. A master-slave communication system as claimed in claim 2, further comprising a control card for said communication switch, the control card associated with said master controller.

11. A master-slave communication system as claimed in claim 10, wherein said local commands executed by said plurality of slave devices are used to replace other commands directed by said master controller to said plurality of slave devices.

12. A master-slave communication system as claimed in claim 1, wherein said master and slave communications controllers are data link controllers.

13. A master-slave communication system as claimed in claim 12, wherein said data link controllers are HDLC controllers.

14. A master-slave control system for controlling elements in a digital communication switch, comprising:
- a master controller for generating master commands;
- a plurality of slave devices operable to receive said master commands, and execute local commands in response thereto;
- a control card for said communication switch, the control card being associated with said master controller;
- a plurality of master communications controllers associated with the master controller, each communication controller corresponding to a respective slave device for sending said master commands thereto according to a predetermined protocol;
- a slave communications controller associated with each slave device and communicating with a respective corresponding master communications controller;
- a first time division multiplexer (TDM) coupled to each of the master communications controllers and operable to form a TDM stream, the TDM stream having a respective timeslot assigned to each master communication controller;
- a first time division demultiplexer coupled to each the slave communications controller;
- said first time division multiplexer and said first time division demultiplexer providing an independent downstream communications link between each said master communications controller and the corresponding slave communications controller; and
- a second time division multiplexer (TDM) coupled to each slave communications controllers and operable to form a TDM stream, the TDM stream having a respective timeslot assigned to each slave communication controller;
- a second time division demultiplexer coupled to each master communications controller;
- said second time division multiplexer and said second time division demultiplexer providing an independent upstream communications link between each said master communications controller and the corresponding slave communications controller;
- said master communications controllers being operable to transmit said master commands independently to, and receive responses independently from, each said slave device to permit concurrent polling by said master controller of said slave devices; and
- said master controller being operable to issue said master commands based on the collective status of all said slave devices.

15. A master-slave control system for a digital communication switch as claimed in claim 14, wherein said at least one slave device is each locatable on a separate shelf from said master controller.

16. A master-slave control system for a digital communication switch as claimed in claim 15, wherein one or more of said at least one slave device is a fabric interface card.

17. A master-slave control system for a digital communication switch as claimed in claim 15, wherein one or more of said at least one slave device is a line card.

18. A master-slave communication system as claimed in claim 14, wherein said master and slave communications controllers are data link controllers.

19. A master-slave communication system as claimed in claim 18, wherein said data link controllers are HDLC controllers.

* * * * *